United States Patent
Henry (10) Patent No.: US 9,892,414 B1
(45) Date of Patent: Feb. 13, 2018

(54) METHOD, MEDIUM, AND SYSTEM FOR RESPONDING TO CUSTOMER REQUESTS WITH STATE TRACKING

(71) Applicant: ASAPP, INC., New York, NY (US)

(72) Inventor: Shawn Henry, Brooklyn, NY (US)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 15/678,890

(22) Filed: Aug. 16, 2017

(51) Int. Cl.
| | | |
|---|---|---|
| *G06Q 30/00* | (2012.01) | |
| *G06F 17/30* | (2006.01) | |
| *G06N 3/04* | (2006.01) | |
| *G06N 3/08* | (2006.01) | |
| *G06Q 30/06* | (2012.01) | |

(52) U.S. Cl.
CPC ....... *G06Q 30/01* (2013.01); *G06F 17/30867* (2013.01); *G06N 3/0445* (2013.01); *G06N 3/08* (2013.01); *G06Q 30/0617* (2013.01)

(58) Field of Classification Search
CPC ............... G06Q 30/01; G06Q 30/0617; G06F 17/30867; G06N 3/0445; G06N 3/08
See application file for complete search history.

(56) References Cited

U.S. PATENT DOCUMENTS

| | | |
|---|---|---|
| 9,715,496 B1 | 7/2017 | Sapoznik et al. |
| 2005/0027738 A1* | 2/2005 | Kraft ..................... G06Q 10/10 |

OTHER PUBLICATIONS

Wang, Wenli, et al. "E-process design and assurance using model checking." Computer 33.10 (2000): 48-53.*

* cited by examiner

*Primary Examiner* — Matthew Zimmerman
(74) *Attorney, Agent, or Firm* — GTC Law Group PC & Affiliates (57) ABSTRACT

Mathematical models and a state vector may be used to respond to a customer and perform actions for the customer, such as transmitting an API request to a server to update the customer's address. The mathematical models may include a message encoding model to generate a representation of a message received from a customer, a message generation model to generate a message to transmit to a customer, an API request model to generate an API request to transmit to a server, an API response encoding model to generate a representation of an API response, a state update model to update the state vector using another model output, and an action model to select an action to be performed. A mathematical model may process the state vector in determining an output, and an output of the mathematical model may also be used to update the state vector.

20 Claims, 6 Drawing Sheets

| |
|---|
| Receive message 3 ("My new address is ...") |
| Encode third message 202 to message vector |
| Update state to state 4 |
| Select action NER |
| Extract address from message |
| Update state to state 5 |
| Select action SEND_MESSAGE |
| Generate and send fourth message 212 to customer ("I am submitting ...") |
| Update state to state 6 |
| Select action API_REQUEST |
| Generate and transmit API call |
| Update state to state 7 |
| Select action WAIT |

| |
|---|
| Initialize state to state 1 |
| Receive first message 201 ("I need to update my address") |
| Encode first message 201 to message vector |
| Update state to state 2 |
| Select action SEND_MESSAGE |
| Generate and send second message 211 to customer ("Sure, I can help you ...") |
| Update state to state 3 |
| Select action WAIT |

Fig. 4A

| |
|---|
| Receive message 3 ("My new address is ...") |
| Encode third message 202 to message vector |
| Update state to state 4 |
| Select action NER |
| Extract address from message |
| Update state to state 5 |
| Select action SEND_MESSAGE |
| Generate and send fourth message 212 to customer ("I am submitting ...") |
| Update state to state 6 |
| Select action API_REQUEST |
| Generate and transmit API call |
| Update state to state 7 |
| Select action WAIT |

Fig. 4B

| Receive response to API call |
|---|
| Encode response to response vector |
| Update state to state 8 |
| Select action SEND_MESSAGE |
| Generate and send fifth message 213 to customer ("Your address has been …") |
| Update state to state 9 |
| Select action WAIT |

Fig. 4C

| Receive sixth message 203 ("No, that is it. Thank you.") |
|---|
| Encode sixth message 203 to message vector |
| Update state to state 10 |
| Select action END |

METHOD, MEDIUM, AND SYSTEM FOR RESPONDING TO CUSTOMER REQUESTS WITH STATE TRACKING

FIELD OF THE INVENTION

The present invention relates to using mathematical models and a state vector for responding to customer requests.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

Some existing techniques for allowing customers to interact with companies may be a nuisance to the customer. Navigating to the right page on a website or an app or navigating a voice menu on a phone call may be time consuming. Some existing techniques for allowing customers to interact with companies may be expensive for a company to implement. Hiring customer service representatives to manually respond to requests and answer phone calls may be a significant expense.

BRIEF DESCRIPTION OF THE FIGURES

The invention and the following detailed description of certain embodiments thereof may be understood by reference to the following figures.

DETAILED DESCRIPTION

Described herein are techniques for facilitating a response to a customer request using mathematical models (e.g., neural networks) and a state (e.g., a state vector) that is used by the mathematical models. The mathematical models may be used to automate aspects of the response. For example, a first mathematical model may automate communications with the customer, such as by generating text to answer a customer's question. A second mathematical model may automate communications between computers and generate data that allows computers to perform actions on behalf of a customer, such as generating data of a REST API call to update the customer's address. The state may track the actions performed by the different mathematical models so that future processing can take into account what has already happened during the session with the customer, such as storing information about messages received from the customer, messages transmitted to the customer, communications between computers, and actions performed on behalf of the customer.

Different mathematical models may have different functionality to facilitate responding to a customer request. For example, a message encoding model may process text of a message received from customer to create a vector that represents the message and that may be used by other models; a named entity recognition model may extract named entities from the message (e.g., an address); an action model may be used to select an action to be performed, such as sending a message back to the customer or making an API request to cause a computer to perform an action on behalf of the customer (e.g., change the customer's address); an API request model may be used to generate data corresponding to an API request to be transmitted; an API response encoding model may process data of a response to an API request to create a vector that represents the response and that may be used by other models; a state update model may process data created by other models to update a state vector that tracks interactions with the customer; and a message generation model may generate text of a message to present to a customer. Each of these models may use the state vector and/or the outputs of the models may be used to update the state vector for later processing.

The state vector used by the models may improve the performance of a system for responding to a customer request. The state vector may include information about the various stages of interacting with a customer (e.g., messages sent, messages received, actions performed, API requests transmitted). Accordingly, the state vector may track information in different stages of the interactions and be able to use the information in different stages in deciding the processing for the next stage. Including information about the multiple stages of the interactions in the decision making process may result in the models making better decisions and provide a better experience for the customer.

In some implementations, a system for responding to customer requests may be fully automated. In some implementations, a system for responding to customer requests may include a person, such as a customer service representative. The system may present suggestions (e.g., messages to send to the customer or information about API requests to be transmitted on behalf of the customer) to the customer service representative, and the customer service representative may approve them or otherwise cause them to be implemented. In some implementations, the system may be semi-automated where some actions are performed automatically (e.g., those with a high confidence of being correct or without harmful side effects) and other actions may require approval of a customer service representative. In some implementations, a system may use these techniques to respond to requests of individuals who are not customers, such as to respond to a message of a friend or family member. For clarity of presentation, an example of responding to a customer is used in the following description, but the techniques described herein are not limited to responding to a customer and may be used for any appropriate response.

Figure 1:
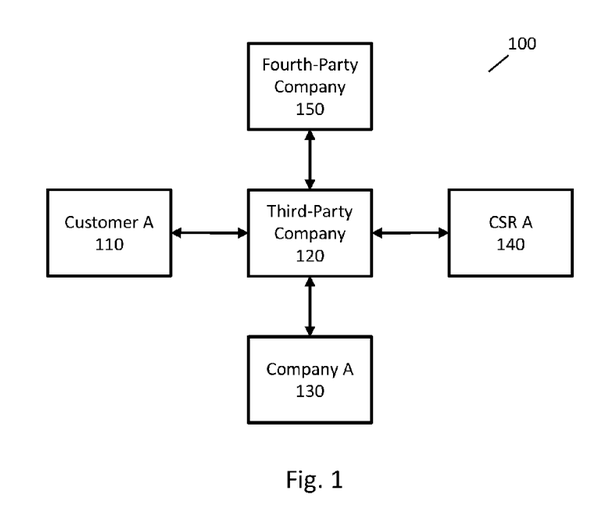
FIG. 1 is an example system where a third-party company provides services to a company relating to responding to a request of a customer.

FIG. 1 is an example system 100 for responding to a request of a customer. In FIG. 1, customer A 110 is making a request relating to a product or service provided by company A 130. Third-party company 120 is a company that provides services to other companies (e.g., company A 130) to assist those companies in responding to customer requests. In some implementations, customer service representative A (CSR A) 140 may assist in responding to a request of customer A 110. CSR A 140 may be an employee of company A 130 or of third-party company 120, may be a contractor of company A 130 or third-party company, or may be provided by another company. In some implementations, a response to a request of customer A 110 may be generated automatically and a CSR is not needed. Third-party company 120 may also provide services to other companies, such as company B and company C (not shown) to assist these companies in responding to requests from their customers.

Customer A 110 may use a customer device to make a request to company A 130. The customer device may include any appropriate device, such as a smart phone, tablet, wearable device, or Internet of things device. The customer may submit the request using any appropriate technique, such as typing or speaking a request to an app running on the customer device (e.g., an app of a particular company or a third-party app created for processing customer requests), typing or speaking a request on a web page, sending a text message, or sending an email. As used herein, a text message includes any message sent as text including but not limited to a message sent using SMS (short message service) or a special purpose application (e.g., Facebook messenger, Apple iMessage, Google Hangouts, or WhatsApp).

A request sent by customer A 110 may be a message in the form of audio or text and may be sent direct directly to third-party company 120 or may be sent to third-party company 120 via company A 130. It may not be apparent to customer A 110 that third-party company 120 is receiving and processing the message, and it may appear to customer A 110 that he or she is communicating only with company A 130. Where responses to the customer are fully automated, it may not be apparent to the customer that mathematical models are used to respond to the customer, and it may appear to the customer that he or she is communicating with a person.

Third-party company 120 may receive text of the message of customer A 110 and assist in responding to the customer request. For example, third-party company may use mathematical models to perform semantic processing to understand the content of the request, to perform an action on behalf of the customer (e.g., change an address), and to provide a message back to the customer. Third-party company 120 may use mathematical models to generate API requests and transmit the generated API requests to computers of company A 130 to cause computers of company A 130 to perform actions or update stored information relating to customer A 110. Third-party company 120 may also generate and transmit API requests to other entities, such as fourth-party company 150. Fourth-party company may be any entity that assists third-party company 120 or company A 130 in responding to customer requests. For example, fourth-party company 150 may provide payment services or provide services such as customer support forums or an issue tracking system.

In some implementations, company A 130 may directly provide the services of third-party company 120 instead of using third-party company 120 to provide those services. In such implementations, third-party company 120 and company A 130 may be merged into a single entity that provides all the operations described herein.

Figure 2:
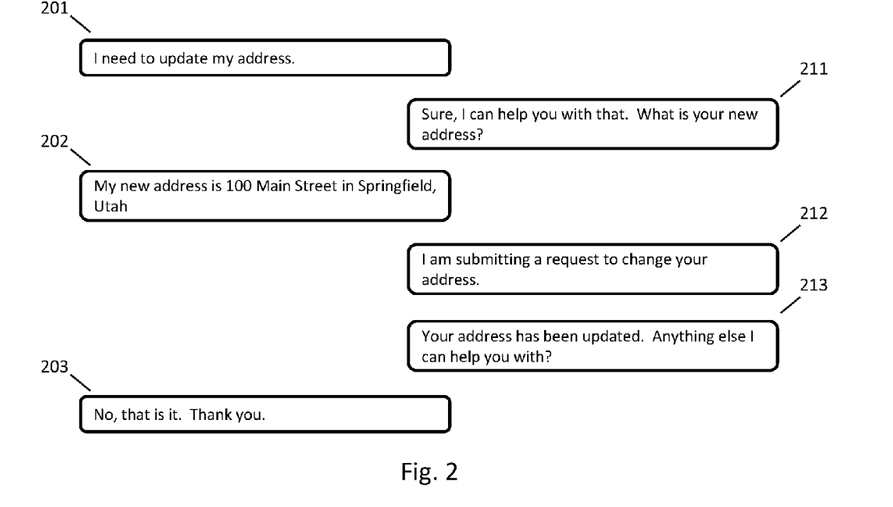
FIG. 2 is an example customer support session showing messages between a customer and a company.

FIG. 2 illustrates several messages in an example customer support session. The messages on the left are sent by the customer and the messages on the right are sent by third-party company. The messages sent by third-party company may be sent automatically or may be suggested to a customer service representative who approves the sending of the messages (and perhaps modifies them).

In the example of FIG. 2, the customer sends first message 201 indicating that the customer needs to update his or her address. The first message 201 may be received by third-party company (either directly or indirectly) and third-party company may process the first message 201 with a message encoding model to convert the text of the message into a message encoding vector that may be processed by other models.

Third-party company may process the message encoding vector to determine that the customer would like to change his or her address but has not yet provided the new address. Based on this information, third-party company may determine to send a message to the customer to ask the customer to provide the new address. Third-party company may generate second message 211 using a message generation model and send it to the customer.

The customer then sends third message 202 that includes the new address. Third-party company also process this message with a message encoding model to generate a message encoding vector and/or extract the new address from the message using named entity recognition.

Third-party company may then determine to transmit an API request to a server computer of the company to cause the customer's address to be updated. In some implementations, third-party company may use an API request model (e.g., a neural network) to automatically generate data corresponding to the API request as described in greater detail below. In conjunction with generating and transmitting the API request, third-party company may transmit a message to the customer to inform him or her that the address update is in progress. Third-party company may generate fourth message 212 using the message generation model and transmit the message to the customer.

Third-party company may then receive a response to the API request from the server computer of the company. For example, the API response may correspond to data confirming that the customer's address was updated. Third-party company may process the response with an API response encoding model to convert the data of the response into an API response vector that may be processed by other models. Third-party company may then determine to send a message to the customer to inform him or her that the address change is complete and to ask the customer if any additional assistance is needed. Third-party company may generate fifth message 213 using the message generation model and transmit the message to the customer.

The customer may then respond with sixth message 203 indicating that no additional assistance is needed. Third-party company may process sixth message 203 with the message encoding model and may then end the customer support session with the customer.

Figure 3:
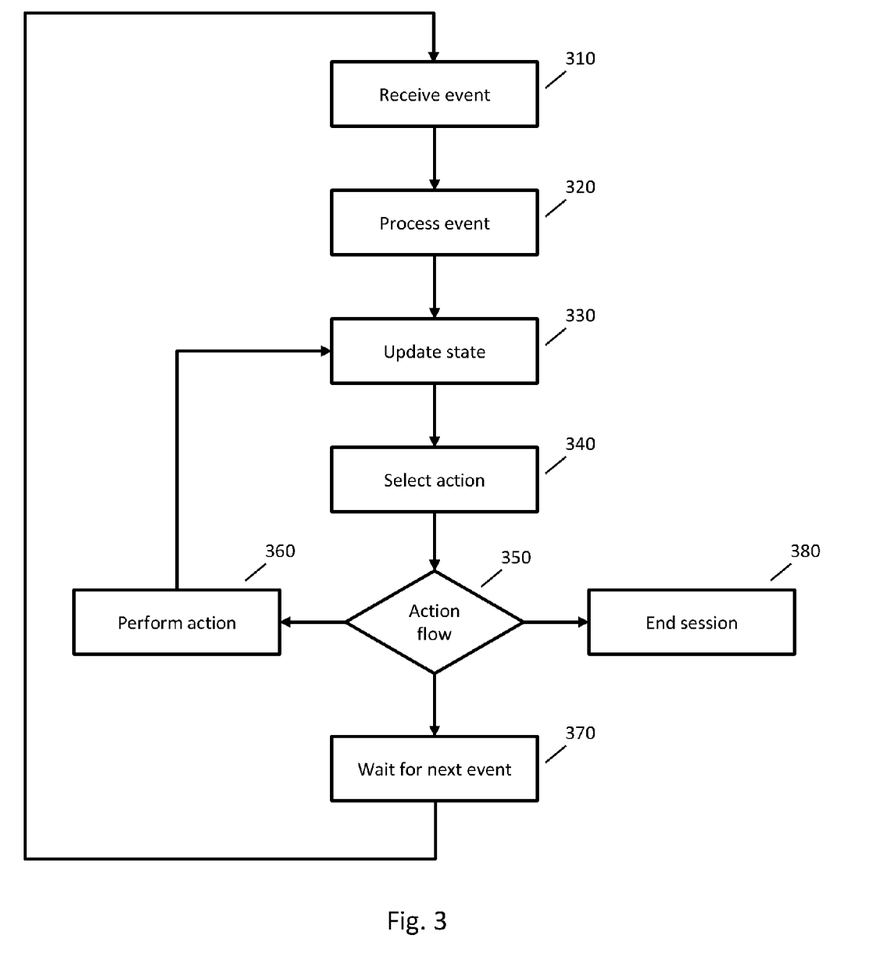
FIG. 3 is a flowchart of an example implementation of using a state vector to respond to customer requests.

FIG. 3 is a flowchart of an example implementation of using one or more mathematical models and a state vector to respond to a customer request, such as the request of FIG. 2. In FIG. 3, the ordering of the steps is exemplary and other orders are possible, not all steps are required, and, in some implementations, some steps may be omitted or other steps may be added. The process of the flowcharts may be implemented, for example, by any of the computers or systems described herein.

For clarity of presentation, some of the data used by the processing of FIG. 3 will be referred to as a vector, such as a message encoding vector or a state vector. This data need not be in the form of a vector and may be stored in any appropriate form, such as a matrix. As used herein, a vector comprises any format of storing data, and the data does not need to be stored as a list or an array.

At step 310, an event is received. An event may be the receipt of any information relating to a customer request. For example, receiving an event may correspond to receiving a message from a customer, receiving a response to an API request, or receiving a response to a database query. The receipt of the event may cause a new customer support session to be created, such as when receiving an initial message from a customer. The received event may also be processed by an existing customer support session, such as when receiving subsequent messages from a customer or when receiving a response to an API request or database query that was performed as part of an existing customer support session. Any appropriate techniques may be used to create a new customer support session or cause an event to be processed by an existing customer support session.

Where a new customer support session is created, a state vector may be initialized to represent the state of the customer support session. The state vector may be initialized to a default value (such as a vector of zeros) or may be initialized using previous support sessions with the same customer or using information obtained from a customer account or profile of the customer.

At step 320, the event is processed, and the processing performed may depend on a type of the event.

Where the event is the receipt of a message from a customer, processing the event may correspond to processing text of a message with a text encoding model to generate a message encoding vector that represents the message. For example, the message encoding model may be a neural network that creates a message embedding that represents the message in an N-dimensional vector space with a vector of length N of floating point values.

In some implementations, a message encoding model may convert the text of the message to a matrix of word embeddings and apply a bidirectional recurrent neural network (e.g., using long short-term memory) to the word embeddings to generate the message encoding vector. The recurrent neural network may be initialized using the current value of the state vector. For example, a recurrent neural network may have an internal state vector, and the values of the internal state vector of the recurrent neural network may be set to the values of the current state vector before processing the word embeddings. The message encoding vector may be obtained from the recurrent neural network. For example, the message encoding vector may be created using the final hidden states of the recurrent neural network or other states of the recurrent neural network. In some implementations, the message encoding model may also process other inputs, such as a message generation vector (output by a message generation model as described below) or an attention vector computed using previous messages received from the customer. A message encoding model may also apply any of the techniques described below for the API response encoding model.

In some implementations, a message received from a customer may include data other than text or may not include text. A customer may be presented with a user interface and the customer interact with user interface elements, such as filling out fields of a form and/or clicking a button. A message received from a customer may include information about actions of the customer on the user interface instead of or in addition to receiving a text message. For example, an HTTP post may be received that includes user interface data describing the actions of the customer. A message that contains user interface data may be processed in a similar manner as a message that contains text. For example, a user interface data encoding model may process the user interface data to generate a user interface data vector. The user interface data encoding model may be implemented using any appropriate techniques, such as the techniques described above for the message encoding model.

Where the event is the receipt of a response to an API request, processing the event may correspond to processing data of the API response (e.g., text corresponding to a JSON or XML data structure) with an API response encoding model to generate an API response vector that represents the API response. For example, the API response encoding model may be a neural network that creates a vector that represents the API response in an N-dimensional vector space with a vector of length N of floating point values. An API response encoding model may also be implemented using a neural network, such as the recurrent neural network described above for the message encoding model. The API response vector may be created using the final hidden states or other states of the recurrent neural network.

In some implementations, an API response may be encoded by an API response encoding model as follows. An API response may be represented by a sequence of tokens from a vocabulary of possible tokens. For example, the vocabulary of tokens may include letters and other symbols that may be used to construct an API response. Each of the tokens in the vocabulary may be represented as a token embedding similar to the other embeddings described herein. Let $k_1, \ldots, k_n$ represent the n tokens in a received API response. This sequence of tokens may be converted to a sequence of token embeddings denoted as $w_1, \ldots, w_n$. A token embedding may be computed in advance and the conversion of a token to a token embedding may be performed using a lookup table.

An API response vector may be generated by sequentially processing the sequence of token embeddings for t from 1 to n:

$$f_t = \sigma(U_f w_t + V_f h_{t-1} + b_f)$$
$$i_t = \sigma(U_i w_t + V_i h_{t-1} + b_i)$$
$$o_t = \sigma(U_o w_t + V_o h_{t-1} + b_o)$$
$$c_t = f_t \circ c_{t-1} + i_t \circ \tanh(U_c w_t + V_c h_{t-1} + b_c)$$
$$h_t = o_t \circ \tanh(c_t)$$

where $h_0$ is an initial RNN state vector that may be initialized with the current state vector; $c_0$ is an initial memory vector that may be initialized as a zero vector; $U_f$, $V_f$, $U_i$, $V_i$, $U_o$, $V_o$, $U_c$, and $V_c$ are weight matrices; $b_f$, $b_i$, $b_o$, and $b_c$ are bias vectors; $\sigma$ is the logistic sigmoid function; and $\circ$ is an element-wise product. The API response vector may be $h_n$ or $h_t$ for the final iteration.

Where the event is the receipt of a response to a database query, processing the event may correspond to processing data of the response to the database query (e.g., key, value pairs representing data returned from the database) with a query response encoding model to generate a query response vector that represents the query response. For example, the query response encoding model may be a neural network that creates a vector that represents the query response in an N-dimensional vector space with a vector of length N of floating point values. A query response encoding model may also be implemented using a neural network, such as the recurrent neural networks described above. The query response vector may be created using the final hidden states or other states of the recurrent neural network.

A result of the processing of the event is an event vector that was created by encoding the event and that represents information corresponding to the event. For example, the event vector may be a message encoding vector, a user interface data vector, an API response vector, or a query response vector.

At step 330, the state vector is updated using a state update model and the event vector from step 320. The state update model may be any model that processes an event vector and outputs an updated state vector. The state update model may also receive a current state vector as input or the current state vector may be included in the parameters of the state update model. In some implementations, a state update model may be implemented using a recurrent neural network (e.g., using long short-term memory). In some implementations, a different state update model may be used depending on the type of event processed at step 320. For example, a first state update model may be used to process a message encoding vector, a second state update model may be used to process an API response vector, and a third state update model may be used to process a query response vector.

The updated state vector generated at step 330 includes information about the event by processing the event vector. For example, where the event is the receipt of a message from the customer, the updated state vector may include information about the words in the message or the meaning of the message, such as that customer would like to change his address. Where the event is the receipt of a response to an API request, the updated state vector may include information about the response, such as whether or not the request was successful or data returned in the response, such as returning the current address of the customer. In some implementations, the state vector may store the information in a way that is not readily understandable to a person. For example, the state vector may be a vector of floating point numbers that do not have a clear meaning to a person.

In some implementations, a state vector may be updated using a recurrent neural network (RNN) as follows. Let $s_{t-1}$ be the current state vector that is to be updated using an event vector denoted as e. The updated state vector may be denoted as $s_t$. A further updated state vector using another event vector may then be referred to as $s_{t+1}$, and so forth.

The state vector may be updated as follows:

$$f = \sigma(U_f e + V_f s_{t-1} + b_f)$$
$$i = \sigma(U_i e + V_i s_{t-1} + b_i)$$
$$o = \sigma(U_o e + V_o s_{t-1} + b_o)$$
$$c_t = f \circ c_{t-1} + i \circ \tanh(U_c e + V_c s_{t-1} + b_c)$$
$$s_t = o \circ \tanh(c_t)$$

where $c_{t-1}$ is a memory vector of the RNN that is updated to $c_t$ for a subsequent stage of processing; $U_f$, $V_f$, $U_i$, $V_i$, $U_o$, $V_o$, $U_c$, and $V_c$ are weight matrices; $b_f$, $b_i$, $b_o$, and $b_c$ are bias vectors; $\sigma$ is the logistic sigmoid function; and $\circ$ is an element-wise product.

At step 340, an action is selected using an action model. An action model may be used to select an action from a list of available actions. The list of available actions may include any appropriate actions, such as sending a message to the customer, performing named entity recognition on a message of the customer, transmitting an API request, querying a database, waiting for an event (e.g., for the customer to respond to a message or a response to an API request), or ending a customer support session. In some implementations, an action model may process a state vector and output a vector where each element of the vector includes a score corresponding to an available action. An action may be selected by selecting the action having a highest score in the output vector. In some implementations, an action model may be a neural network, such as a multi-layer perceptron.

In some implementations, an action may be selected using a multi-layer perceptron (MLP) as follows. Let s be a current state vector that is being used to select an action. An MLP may generate a probability distribution vector p over the available actions as follows:

$$h = \tanh(W_1 s + b_1)$$
$$p = softmax(W_2 h + b_2)$$

where $W_1$ and $W_2$ are weight matrices and $b_1$ and $b_2$ are bias vectors. An action may then be selected using the probability distribution vector p. For example, each element of the vector may correspond to an action, and an action having the highest probability may be selected.

At step 350, further processing is determined based on the selected action at step 340. For example, where the selected action corresponds to ending the customer support session, processing may proceed to step 380 where the customer support session is ended (e.g., sending a final message to the customer and closing the network connection with the customer).

Where the selected action corresponds to waiting for a next event (e.g., to wait for a message from the customer or a response to an API call), then processing may proceed to step 370 to wait for the next event. After a next event is received, processing may proceed to step 310 where the event is processed as indicated above.

Where the selected action corresponds to other actions, processing may proceed to step 360 where the action is performed. For example, a message may be generated and sent to a customer, an API request may be generated and transmitted to a server computer, a database query may be generated and submitted, or named entity recognition may be performed on one or more messages received from the customer.

Where the action corresponds to generating a message to send to the customer and transmitting the message to the customer, a message generation model may be used to generate the message. The message generation model may process the state vector and output text of a message. In some implementations, the message generation model may also process other inputs, such as a message encoding vector from a previous message (output by a message encoding model) or an attention vector computed using previous messages. Any appropriate techniques may be used for a message generation model, such as any of the techniques described below for the API request generation model.

In addition to generating the message, the message generation model may also compute a message generation vector that represents the generated message. For example, the message generation vector may represent the generated message in an N-dimensional vector space with a vector of length N of floating point values. The message generation vector may be computed using any appropriate techniques, such as the techniques described below for the action vector.

In some implementations, a message generation model may use a generative model, such as a recurrent neural network (e.g., using long short-term memory) that iteratively generates words of a message by outputting one-hot vectors representing words in the vocabulary. The state vector may be an initial input to the recurrent neural network or values of an internal state of the recurrent neural network may be set to the values of the state vector. In some implementations, a message generation model may use a partially generative model. For example, a classifier, such as a multi-layer perceptron, may process the state vector to select a message template from a set of message templates, and a generative model may generate values for variables in the template. For another example, a message generation model may use a model, such as a recurrent neural network, to generate a message template with variables, and a discriminative model, such as a named entity recognition model, may be used to determine values for the variables. In some implementations, a message generation model may use a discriminative model. For example, a classifier, such as a multi-layer perceptron, may select a message template from a set of message templates, and a discriminative model, such as a named entity recognition model, may be used to determine values for the variables.

A template may represent any combination of static and dynamic data. The static data may be the same for each use of the template and the dynamic data may change between uses of the template. For example, the dynamic data may be specified by variables in the template. Any appropriate format and technology may be used for templates, such as Jinja, Handlebars, or Smarty templates.

In some implementations, a generated message may include data other than text or may not include text. A generated message may include data relating to user interface elements to present to the customer, such as form fields and/or buttons. When the message is received by a computer of the customer, software running on the computer (e.g., JavaScript) may cause the user interface to be updated using the data in the message. For example, any of the techniques described in U.S. patent application Ser. No. 15/638,543 may be used to transmit data to a customer and update the user interface of the customer. U.S. patent application Ser. No. 15/638,543, filed on Jun. 30, 2017, is herein incorporated by reference in its entirety for all purposes.

Where the action corresponds to generating an API request to transmit to a server and transmitting the API request to the server, an API request model may be used to generate the API request. The API request model may process the state vector and output data corresponding to an API request. In some implementations, the API request model may also process other inputs, such as an API response vector from a previous API response (output by an API response encoding model) or an attention vector computed using previous API requests or responses. Any appropriate techniques may be used for an API request model.

In addition to generating the API request, the API request generation model may also compute an API request vector that represents the generated API request. For example, the API request vector may represent the API request in an N-dimensional vector space with a vector of length N of floating point values. The API request vector may be computed using any appropriate techniques, such as the techniques described below for the action vector.

In some implementations, an API request model may use a generative model, such as a recurrent neural network (e.g., using long short-term memory) that iteratively generates tokens or characters of an API request by outputting one-hot vectors representing tokens or characters of a vocabulary. The state vector may be an initial input to the recurrent neural network or values of an internal state of the recurrent neural network may be set to the values of the state vector. In some implementations, an API request model may use a partially generative model. For example, a classifier, such as a multi-layer perceptron, may process the state vector and select an API request template from a set of API request templates, and a generative model may generate values for variables in the template. For another example, an API request model may use a generative model, such as a recurrent neural network, to generate a template with variables, and a discriminative model, such as a named entity recognition model, may be used to determine values for the variables. In some implementations, an API request model may use a discriminative model. For example, a classifier, such as a multi-layer perceptron, may select an API request template from a set of API request templates, and a discriminative model, such as a named entity recognition model, may be used to determine values for the variables.

In some implementations, an API request model may generate data of an API request using an RNN as follows. An API request may be generated by using a vocabulary of tokens. For example, the vocabulary of tokens may include letters and other symbols that may be used to compose an API request. This vocabulary may be the same vocabulary used for encoding responses to API requests or may be a different vocabulary. Each token of the vocabulary may have a token embedding and a corresponding index into the vocabulary.

A sequence of tokens for an API request may be generated iteratively with the following equations:

$$f_t = \sigma(U_f w_t + V_f h_{t-1} + b_f)$$
$$i_t = \sigma(U_i w_t + V_i h_{t-1} + b_i)$$
$$o_t = \sigma(U_o w_t + V_o h_{t-1} + b_o)$$
$$c_t = f_t \circ c_{t-1} + i_t \circ \tanh(U_c w_t + V_c h_{t-1} + b_c)$$
$$h_t = o_t \circ \tanh(c_t)$$
$$p_t = \mathit{softmax}(W h_t + b)$$
$$k_{t+1} = \mathrm{argmax}(p_t)$$

where $h_0$ is an RNN state vector that may be initialized with the current state vector; $w_1$ is a token embedding corresponding to a special start token in the vocabulary (that indicates the beginning of a sequence); $c_0$ is an RNN memory vector that may be initialized as a zero vector; $U_f$, $V_f$, $U_i$, $V_i$, $U_o$, $V_o$, $U_c$, $V_c$ and W are weight matrices; $b_f$, $b_i$, $b_o$, $b_c$ and b are bias vectors; $\sigma$ is the logistic sigmoid function; and $\circ$ is an element-wise product.

A first iteration (t=1) of the above equations may generate a probability distribution vector $p_1$, where each element of the vector corresponds to a token in the vocabulary. A token corresponding to the largest element of $p_1$ may be selected and an index of the selected token is denoted $k_2$ ($k_1$ may represent the special start token), where $k_2$ is the index of the selected token in the vocabulary.

For a second iteration (t=2), $w_2$ may represent the token embedding of the token selected in the previous iteration and a token index $k_3$ may then be selected. This process may be repeated for n iterations until a special stop token is selected, and the API request may correspond to the sequence of tokens indicated by the indices $k_2, \ldots, k_n$.

The above processing uses a greedy search to select a sequence of tokens for an API request. In some implementations, other search techniques may be used. For example a beam search may be used as described in U.S. Pat. No. 9,715,496, which is hereby incorporated by reference in its entirety.

An API request vector may be obtained as the final hidden state of the RNN. For example, after n iterations, the final hidden state vector $h_n$ may be selected as the API request vector to represent the generated API request.

Where an action corresponds to generating a database query, any of the techniques described above for generating an API request may also be used to generate a database query. For example, a database query model may be implemented using any of the techniques described above for the API request model. A database query model may also generate a database query vector that represents the database query, similar to the API request vector described above.

Where the action corresponds to performing named entity recognition on one more messages received from the customer, a named entity recognition model may be used to process the messages and extract named entities. The named entity recognition model may also process the state vector. Any appropriate named entities may be extracted, such as named entities relating to an address, a phone number, or a name of the customer. Any appropriate named entity recognition model may be used, such as a classifier implemented with conditional random fields, a bidirectional recurrent neural network with conditional random field output, or an iterated dilated convolutions model. A named entity recognition model may also generate a recognized entities vector that represents the recognized entities, similar to the API request vector described above.

The process of performing the action at step 360 may also include generating an action vector that represents the action that was performed in the form of a vector. For example, an action vector may correspond to a message generation vector, an API request vector, a database query vector, or a recognized entities vector, as described above. Any appropriate techniques may be used to generate an action vector. In some implementations, where a neural network was used to perform the action, an action vector may be generated using the final hidden states or other states of the neural network. In some implementations, a separate encoding model may be used to generate an action vector. For example, where the action corresponds to performing named entity recognition, the recognized named entities may be processed with an encoding model to generate an action vector for the named entities.

After performing the action at step 360, processing may proceed to step 330 where the state vector is updated. The state update model may process the action vector from step 360 to update the state vector. The updated state vector may include information about the action that was performed. For example, where the action was to generate and send a message to the customer, the updated state vector may include information about the words in the generated message or the meaning of the generated message. Where the action was to generate and transmit an API request, the updated state vector may include information about the data in the API request or the purpose of the API request. Where the action was to recognize named entities from a message, the updated state vector may include information about the recognized entities. A state vector may be updated with an action vector using any of the techniques described above for updating a state vector with an event vector.

Processing may continue as described above until an action is selected to end the customer support session. During a session with a customer, the processing of FIG. 3 may involve multiple iterations of updating the state vector using an event vector and/or multiple iterations of updating the state vector using an action vector. Each time the state vector is updated, new information may be added to the state vector. Accordingly, the state vector may include information about multiple events and information about multiple actions. In some implementations, updating the state vector may cause the state vector to gradually forget information from older state updates. For example, a session with a customer may involve receiving 10 messages from a customer, and the state vector may have a high-level of information about the most recently received message and a low-level of information about the first received message. The state update model may automatically cause older information to be gradually forgotten or given reduced importance in the state vector, and the process by which this happens may not be apparent to a person.

FIGS. 4A-4D illustrate an example sequence of actions that may be performed for the example customer support session of FIG. 2. Each of FIGS. 4A-4D represent a sequence of actions that may be implemented by the process of FIG. 3. For clarity of presentation, each of FIGS. 4A-4D are concluded with a WAIT or END action and subsequent actions are shown in the next figure.

Figure 4A:
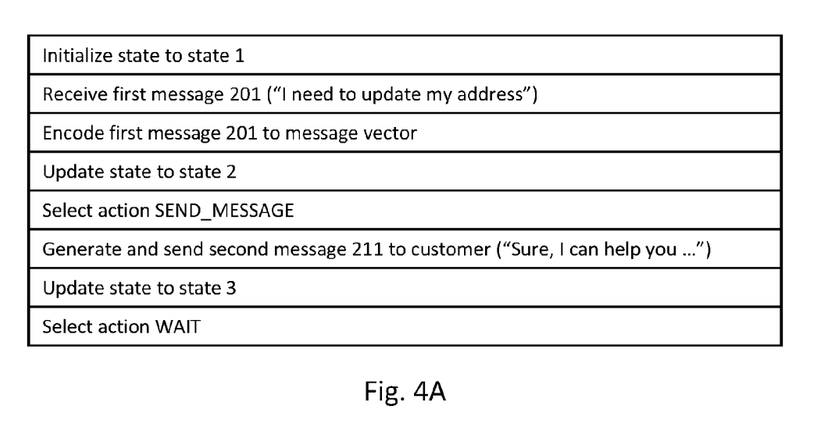
FIGS. 4A-4D are example sequences of actions that may be performed in a customer support session.

In FIG. 4A, a state of the customer support session is initialized and the initial state is referred to as state 1. The customer support session may be created, for example, by a customer performing an action on a customer device, such as navigating to a customer support page. Next, first message 201 is received. First message 201 is then processed by encoding the message with the message encoding model to generate a message encoding vector. Next, the state of the session is updated by processing the message encoding vector with the state update model and the updated state is referred to as state 2. Next, the action model processes the state vector (state 2) and selects the SEND_MESSAGE action to generate and send second message 211 to the customer. Next, the message generation model is used to generate the text of second message 211, and a message generation vector is created that describes the generated message (e.g., from the final hidden states of the message generation model). Second message 211 is then transmitted to the customer. Next, the state of the session is updated by processing the message generation vector with the state update model and the updated state is referred to as state 3. Next, the action model processes the state vector (state 3) and selects the WAIT action to wait for the customer to respond to second message 211.

Figure 4B:
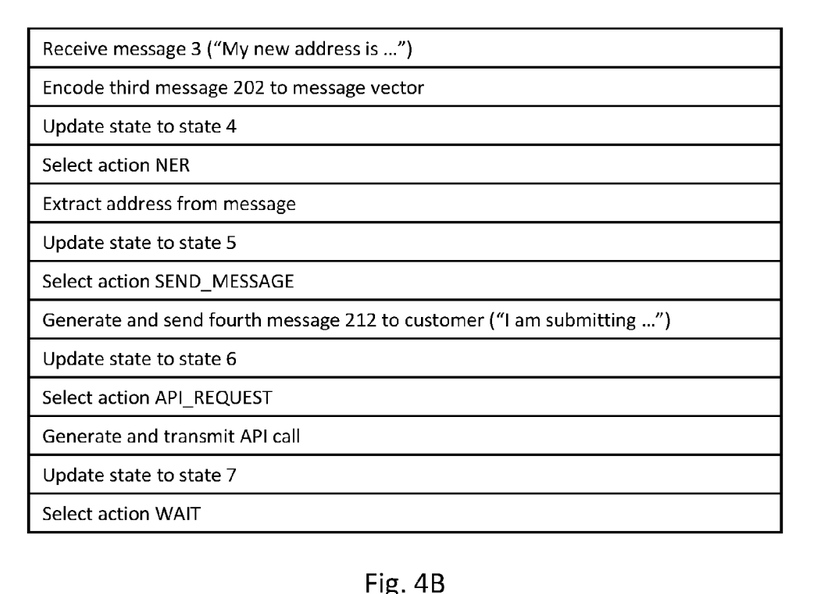

In FIG. 4B, third message 202 is received from the customer and third message 202 is processed by encoding the message with the message encoding model to generate a message encoding vector. Next, the state of the session is updated by processing the message encoding vector with the state update model and the updated state is referred to as state 4. Next, the action model processes the state vector (state 4) and selects the NER action to perform named entity recognition on third message 202. Next, named entity recognition is performed on third message 202 using the named entity recognition model to extract the address of the customer from third message 202. A recognized entities vector is also created, such as by encoding the extracted named entities. Next, the state of the session is updated by processing the recognized entities vector with the state update model and the updated state is referred to as state 5. Next, the action model processes the state vector (state 5) and selects the SEND_MESSAGE action to generate and send fourth message 212 to the customer. Next, the message generation model is used to generate the text of fourth message 212, and a message generation vector is created that describes the generated message. Fourth message 212 is then transmitted to the customer. Next, the state of the session is updated by processing the message generation vector with the state update model and the updated state is referred to as state 6. Next, the action model processes the state vector (state 6) and selects the API_REQUEST action to generate and transmit an API request to a server. Next, the API request model is used to generate an API request to transmit to a server to cause the customer's address to be updated. For example, the generated API request may include an Internet address (e.g., domain name) and parameters that comply with API requests accepted by the server. An API request vector is also created (e.g., from the final hidden states of the API request model). The API request is then transmitted to the server. Next, the state of the session is updated by processing the API request vector with the state update model and the updated state is referred to as state 7. Next, the action model processes the state vector (state 7) and selects the WAIT action to wait for the server to respond to the API request.

Figure 4C:
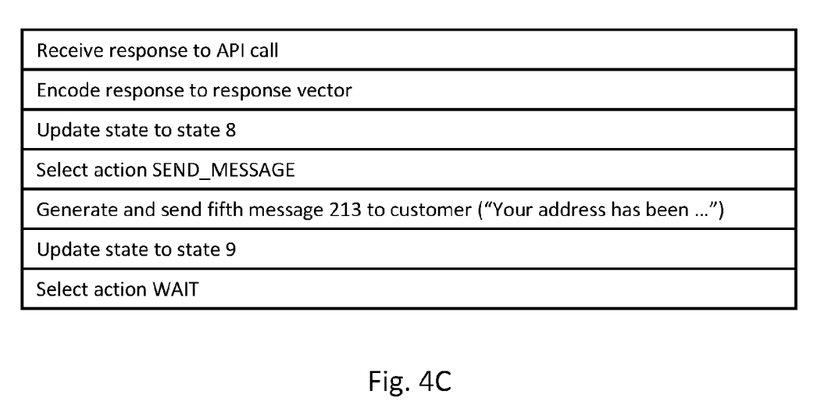

In FIG. 4C, a response to the API request to the server is received, and the API response is processed by encoding the API response with the API response encoding model to generate an API response vector. Next, the state of the session is updated by processing the API response vector with the state update model and the updated state is referred to as state 8. Next, the action model processes the state vector (state 8) and selects the SEND_MESSAGE action to generate and send fifth message 213 to the customer. Next, the message generation model is used to generate the text of fifth message 213, and a message generation vector is created that describes the generated message. Fifth message 213 is then transmitted to the customer. Next, the state of the session is updated by processing the message generation vector with the state update model and the updated state is referred to as state 9. Next, the action model processes the state vector (state 9) and selects the WAIT action to wait for the customer to respond to fifth message 213.

Figure 4D:
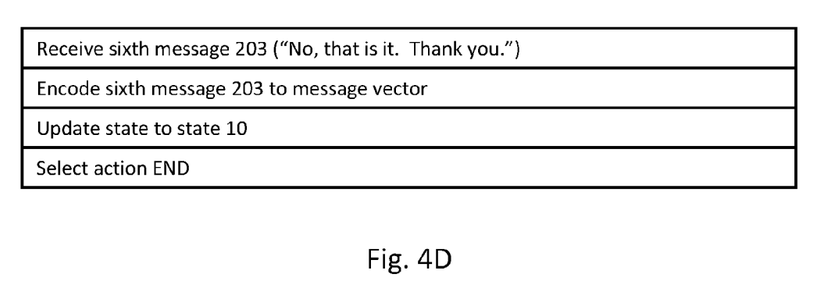

In FIG. 4D, sixth message 203 is received from the customer and sixth message 203 is processed by encoding the message with the message encoding model to generate a message encoding vector. Next, the state of the session is updated by processing the message encoding vector with the state update model and the updated state is referred to as state 10. Next, the action model processes the state vector (state 10) and selects the END action to end the session with the customer. Next, the session with the customer is ended, such as by sending a final message and closing the network connection.

Figure 5:
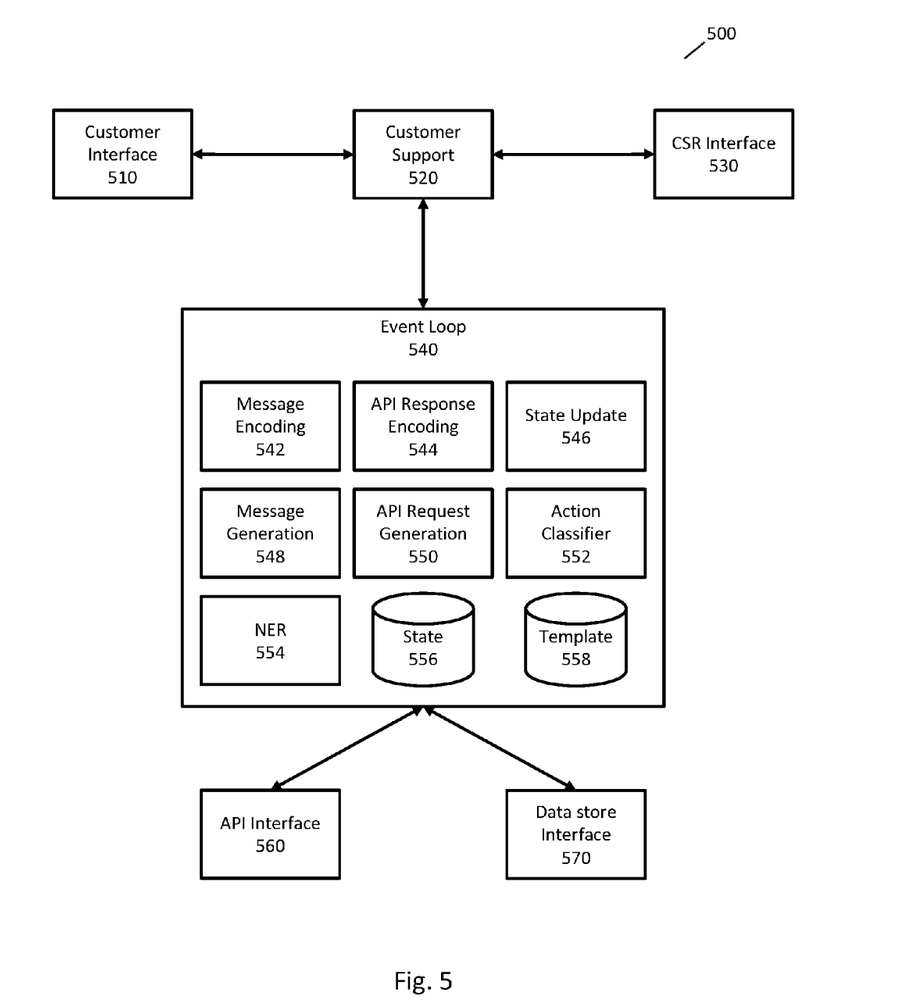
FIG. 5 is an example system for using a state vector to respond to a customer request.

FIG. 5 is an example system 500 that may be used by a company or a third-party company to respond to a request of a customer. FIG. 5 is an example implementation and the techniques described herein are not limited to the example of FIG. 5. For example, the components of FIG. 5 may be split into multiple components or merged together or other components may be included, such as load balancing or any other functionality that may be used with a network-based service.

System 500 may include a customer interface component 510 that may be used to receive information from and transmit information to a customer (e.g., messages). Customer interface component 510 may use any appropriate techniques to communicate with a customer such as establishing an HTTP connection and routing messages to and from a customer support session created to respond to the customer.

System 500 may include a CSR interface component that may similarly be used to receive information from and transmit information to a CSR (e.g., messages). Where system 500 is used to respond automatically to a customer, a CSR may not be used and CSR interface component 530 may not be needed.

System 500 may include a customer support component 520 that assists in responding to a customer. Customer support component 520 may implement any appropriate techniques, such as transmitting messages and other information between customer interface component 520 and CSR interface component 530 or using the services of event loop component 540 in responding to a customer.

System 500 may include event loop component 540 that may perform operations relating to processing events (e.g., the receipt of messages or API responses), updating a state vector for a customer support session, selecting an action to be performed, generating a message to send to a customer, generating an API request to be transmitted to a server, or performing named entity recognition on a message. In system 500, event loop component 540 includes other components, but in some implementations these other components may be external to and communicate with event loop component 540.

Event loop component 540 may include the following components: message encoding component 542 that may be configured to process a received message with a message encoding model to generate a message encoding vector; API response encoding component 544 that may be configured to process an API response with an API response encoding model to generate an API response vector; database query response encoding component (not shown) that may be configured to process a response to a database query with a database query response encoding model to generate a query response vector; state update component 546 that may be configured to process a vector (e.g., a message encoding vector or an API response encoding vector) with a state update model to generate an updated state vector; message generation component 548 that may be configured to generate text of a message using a message generation model; API request generation component 550 that may be configured to generate data of an API request using an API request generation model; database query generation component (not shown) that may be configured to generate data of a database query using a database query generation model; action classifier component 552 that may be configured to process a state vector with an action model to select an action to be performed; named entity recognition component 554 that may be configured to process a message with a named entity recognition model to identify named entities in the message. Each of these components may be implemented using any of the techniques described above.

Event loop component 540 may also include or have access to a state data store 556 that stores a state vector for a customer support session and a template data store 558 that stores templates that may be used to generate messages and API requests. Event loop component 540 may also be connected to API interface component 560 that may be configured to transmit API requests to servers and receive responses to API requests from the servers. Event loop component 540 may also be connected to data store query component 570 that may be configured to perform queries on a data base and receive responses to the queries.

Figure 6:
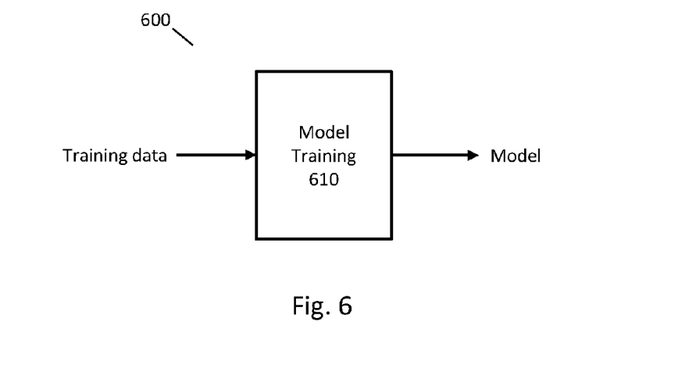
FIG. 6 is an example system for training one or more models that may be used to respond to a customer request using a state vector.

FIG. 6 is an example system 600 that may be used to train one more of the models described above, such as a message encoding model, an API response encoding model, a database query response encoding model, a state update model, a message generation mode, an API request generation model, a database query generation model, an action classifier model, or a named entity recognition model. Each of the models may be trained individually or jointly with other models. For example, a named entity recognition model may be trained separately from the other models to create a named entity recognition model that may be used in a variety of applications. For another example, the action classifier model and the state update model may be trained jointly so that the models perform better in conjunction with each other.

In FIG. 6, system 600 includes a model training component 610 that receives training data and outputs one or models, such as any of the models described above. Any appropriate training data may be used to train the above models. For example, a company may have a timestamped log of customer support sessions that includes messages transmitted between a customer and a CSR, API requests transmitted to a server, responses to API requests, database queries performed, and responses to database queries. The training data may be processed iteratively to allow the models to learn the sequence of operations that were performed by CSRs. The trained models may then generate appropriate outputs when new data is received for processing.

Any appropriate techniques may be used to train the models. In some implementations, the models may be trained end-to-end to maximize the likelihood of the appropriate output in each step of the training data. For example, an action classifier may be trained to maximize the likelihood of the correct next action, a message generation model may be trained to maximize the likelihood of the correct next word of a message, and an API request generation model may be trained to maximize the likelihood of the correct next token or character of generated API request data. Model parameter updates may be computed, for example, using stochastic back-propagation through structure.

In some implementations, reinforcement learning may be used to train the models with reward scores. Any appropriate techniques may be used to generate reward scores that may be used to update the models with reinforcement learning. For example, at the end of a customer support session, the customer may be asked to indicate a satisfaction with the outcome of the session on a scale of 1 to 5 and the satisfaction score and data from the session may be used to improve the models.

In some implementations, where a CSR reviews actions generated by the models before the actions are performed, the approval or disapproval of the CSR may be used to generate a reward score. For example, where the CSR approves an action generated by the models, a positive reward (e.g., 1.0) and the data relating to the generated action may be used to update the models. Where the CSR disapproves an action generated by the models, a negative reward (e.g., −1.0) and the data relating to the generated action may similarly be used to update the models.

In some implementations, a CSR may be presented with a suggested message to send to a customer, and the CSR may modify the message or may enter a new message to send to the customer. A metric or other score indicating a similarity or dissimilarity between the message generated by the models and the message actually sent by the CSR may be used as a reward score. For example, a BLEU (bilingual evaluation understudy) score may be computed and used as a reward score. Similarly, a CSR may be presented with information about an API request to be transmitted, and a score may be computed between the suggested API request and an API request actually used by the CSR, and this score may be used as a reward score for reinforcement learning.

Any appropriate reinforcement learning techniques may be used to train the models, such as any of the techniques described in U.S. application Ser. No. 15/634,733, filed on Jun. 27, 2017, which is herein incorporated by reference. For example, models may be trained using a policy gradient method, such as with stochastic back-propagation through structure. Any appropriate techniques may be used to generate a reward score, such as a discounted reward score, a normalized reward score, a reward baseline, or a weighted sum of multiple reward scores.

Figure 7:
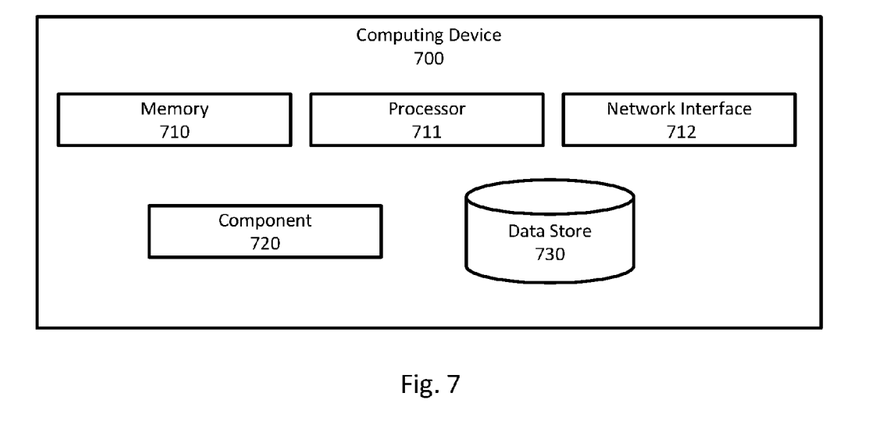
FIG. 7 is an exemplary computing device that may be used to respond to a customer request using a state vector.

FIG. 7 illustrates components of one implementation of a computing device 700 for implementing any of the techniques described above. In FIG. 7, the components are shown as being on a single computing device 700, but the components may be distributed among multiple computing devices, such as a system of computing devices, including, for example, an end-user computing device (e.g., a smart phone or a tablet) and/or a server computing device (e.g., cloud computing).

Computing device 700 may include any components typical of a computing device, such as volatile or nonvolatile memory 710, one or more processors 711, and one or more network interfaces 712. Computing device 700 may also include any input and output components, such as displays, keyboards, and touch screens. Computing device 700 may also include a variety of components or modules providing specific functionality, and these components or modules may be implemented in software, hardware, or a combination thereof. For example, component 720 may comprise any of the components described herein, such as any of the components of the system of FIG. 5. Computing device 700 may include or have access to various data stores. Data stores may use any known storage technology, such as files or relational or non-relational databases. For example, data store 730 may store any data described herein, such as the data stored in the data stores of FIG. 5.

The techniques described above may be combined with any of the techniques described in U.S. Pat. No. 9,715,496 and U.S. patent application Ser. No. 15/638,543 filed on Jun. 30, 2017, each of which is herein incorporated by reference in its entirety for all purposes. For example, any of the techniques described herein may be provided as part of a third-party semantic processing service whereby a third party provides semantic processing services to a company to assist the company in providing customer service to its customers.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for responding to a customer:
receiving a first message from the customer;
computing a message encoding vector by processing text of the first message with a message encoding model, wherein the message encoding vector represents the first message;
updating a state vector by processing the message encoding vector with a state update model;
selecting a first action from a plurality of available actions by processing the state vector with an action model, wherein the first action corresponds to transmitting an API request to a server computer;
performing the first action by (i) generating data corresponding to the API request by processing the state vector with an API request model, (ii) transmitting the data corresponding to the API request to the server computer, and (iii) generating an API request vector that represents the data corresponding to the API request;
updating the state vector by processing the API request vector with the state update model;
receiving an API response from the server computer;
computing an API response vector by processing the API response with an API response encoding model, wherein the API response vector represent the API response;
updating the state vector by processing the API response vector with the state update model;
selecting a second action from the plurality of available actions by processing the state vector with the action model, wherein the second action corresponds to transmitting a message to the customer;
performing the second action by (i) generating text corresponding to a second message by processing the state vector with a message generation model, (ii) transmitting the second message to the customer, and (iii) generating a message generation vector that represents the second message; and
updating the state vector by processing the message generation vector with the state update model.

2. The computer-implemented method of claim 1, comprising:
selecting a third action from the plurality of available actions by processing the state vector with the action model, wherein the third action corresponds to performing named entity recognition on the first message received from the customer; and
performing the third action by (i) recognizing one or more named entities from text of the first message received from the customer and (ii) generating a recognized entities vector that represents the recognized named entities; and
updating the state vector by processing the recognized entities vector with the state update model.

3. The computer-implemented method of claim 1, comprising:
selecting a third action from the plurality of available actions by processing the state vector with the action model, wherein the third action corresponds to retrieving data from a database; and
performing the third action by (i) generating data corresponding to a database query by processing the state vector with a database query model, (ii) querying the database using the data corresponding to the database query, and (iii) generating a query vector that represents the data corresponding to the database query; and
updating the state vector by processing the query vector with the state update model.

4. The computer-implemented method of claim 1, wherein generating the data corresponding to the API request comprises:
generating data corresponding to a template by processing the state vector with a recurrent neural network; and
rendering the template by replacing variables of the template with data for the variables.

5. The computer-implemented method of claim 1, wherein generating the data corresponding to the API request comprises:
selecting a template from a plurality of available templates using a template selection model;
rendering the template by replacing variables with data for the variables.

6. The computer-implemented method of claim 5, wherein the data for the variables is generated using a recurrent neural network.

7. The computer-implemented method of claim 5, wherein the data for the variables is generated by performing named entity recognition on the first message received from the customer.

8. A system for presenting information about a resource to a user, the system comprising:
at least one computer comprising at least one processor and at least one memory, the at least one computer configured to:
receive a first message from a customer;
compute a message encoding vector by processing text of the first message with a message encoding model, wherein the message encoding vector represents the first message;
update a state vector by processing the message encoding vector with a state update model;
select a first action from a plurality of available actions by processing the state vector with an action model, wherein the first action corresponds to transmitting an API request to a server computer;
perform the first action by (i) generating data corresponding to the API request by processing the state vector with an API request model, (ii) transmitting the data corresponding to the API request to the server computer, and (iii) generating an API request vector that represents the data corresponding to the API request;
update the state vector by processing the API request vector with the state update model;
receive an API response from the server computer;
compute an API response vector by processing the API response with an API response encoding model, wherein the API response vector represent the API response;
update the state vector by processing the API response vector with the state update model;
select a second action from the plurality of available actions by processing the state vector with the action model, wherein the second action corresponds to transmitting a message to the customer;
perform the second action by (i) generating text corresponding to a second message by processing the state vector with a message generation model, (ii) transmitting the second message to the customer, and (iii) generating a message generation vector that represents the second message; and update the state vector by processing the message generation vector with the state update model.

9. The system of claim 8, wherein:
the first message corresponds to a request for customer support to a company;
the at least one computer is operated by an entity other than the company; and
the server computer is operated by the company.

10. The system of claim 8, wherein the at least one computer is configured to perform the second action by presenting the second message to a customer service representative and receiving approval from the customer service representative to transmit the second message to the customer.

11. The system of claim 8, wherein the at least one computer is configured to perform the first action by presenting information about the API request to a customer service representative and receiving approval from the customer service representative to transmit the data corresponding to the API request to the server computer.

12. The system of claim 8, wherein the at least one computer is configured to:
select a third action from the plurality of available actions by processing the state vector with the action model, wherein the third action corresponds to waiting for the first message from the customer or a response to the API request.

13. The system of claim 8, wherein the at least one computer is configured to:
select a third action from the plurality of available actions by processing the state vector with the action model, wherein the third action corresponds to ending a session with the customer.

14. The system of claim 8, wherein the text of the first message was obtained from a text message received from the customer or obtained by performing automatic speech recognition on speech of the customer.

15. One or more non-transitory computer-readable media comprising computer executable instructions that, when executed, cause at least one processor to perform actions comprising:
receiving a first message from a customer;
computing a message encoding vector by processing text of the first message with a message encoding model, wherein the message encoding vector represents the first message;
updating a state vector by processing the message encoding vector with a state update model;
selecting a first action from a plurality of available actions by processing the state vector with an action model, wherein the first action corresponds to transmitting an API request to a server computer;
performing the first action by (i) generating data corresponding to the API request by processing the state vector with an API request model, (ii) transmitting the data corresponding to the API request to the server computer, and (iii) generating an API request vector that represents the data corresponding to the API request;
updating the state vector by processing the API request vector with the state update model;
receiving an API response from the server computer;
computing an API response vector by processing the API response with an API response encoding model, wherein the API response vector represent the API response;
updating the state vector by processing the API response vector with the state update model;
selecting a second action from the plurality of available actions by processing the state vector with the action model, wherein the second action corresponds to transmitting a message to the customer;
performing the second action by (i) generating text corresponding to a second message by processing the state vector with a message generation model, (ii) transmitting the second message to the customer, and (iii) generating a message generation vector that represents the second message; and
updating the state vector by processing the message generation vector with the state update model.

16. The one or more non-transitory computer-readable media of claim 15, wherein the second action is performed before the first action.

17. The one or more non-transitory computer-readable media of claim 15, wherein the state update model comprises a recurrent neural network.

18. The one or more non-transitory computer-readable media of claim 15, wherein the action model comprises a multi-layer perceptron.

19. The one or more non-transitory computer-readable media of claim 15, wherein generating the data corresponding to the API request comprises processing the state vector with a recurrent neural network.

20. The one or more non-transitory computer-readable media of claim 15, wherein one or more of the message encoding model, the API response encoding model, the state update model, the action model, the message generation model, or the API request model are trained using reinforcement learning.

* * * * *

UNITED STATES PATENT AND TRADEMARK OFFICE
CERTIFICATE OF CORRECTION

| | | |
|---|---|---|
| PATENT NO. | : 9,892,414 B1 | Page 1 of 1 |
| APPLICATION NO. | : 15/678890 | |
| DATED | : February 13, 2018 | |
| INVENTOR(S) | : Shawn Henry | |

It is certified that error appears in the above-identified patent and that said Letters Patent is hereby corrected as shown below:

In the Specification

In Column 8, Line 21, delete "Lets" and insert -- Let s --, therefor.

Signed and Sealed this
First Day of May, 2018

Andrei Iancu
*Director of the United States Patent and Trademark Office*